United States Patent Office 3,306,169
Patented Feb. 28, 1967

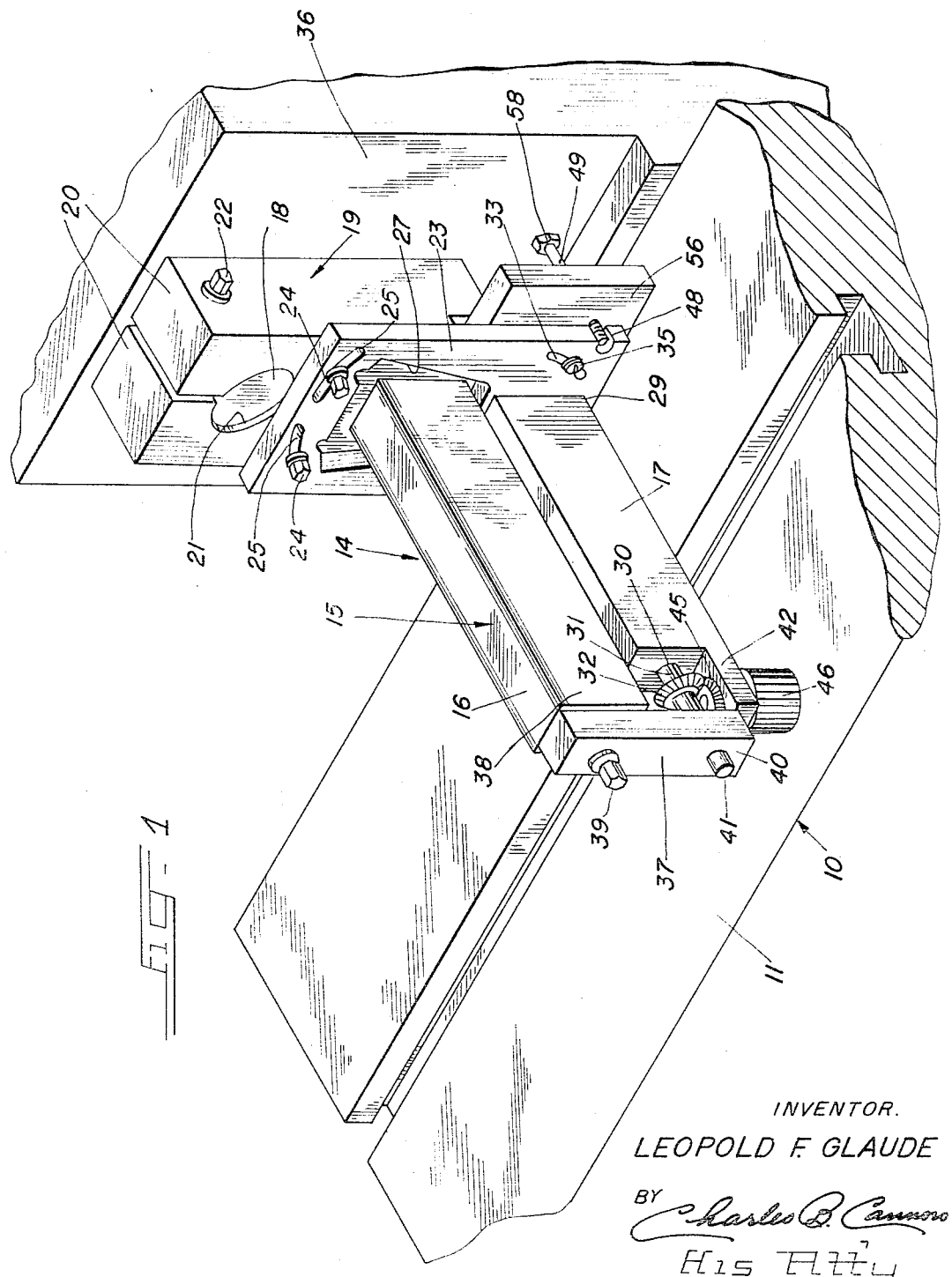

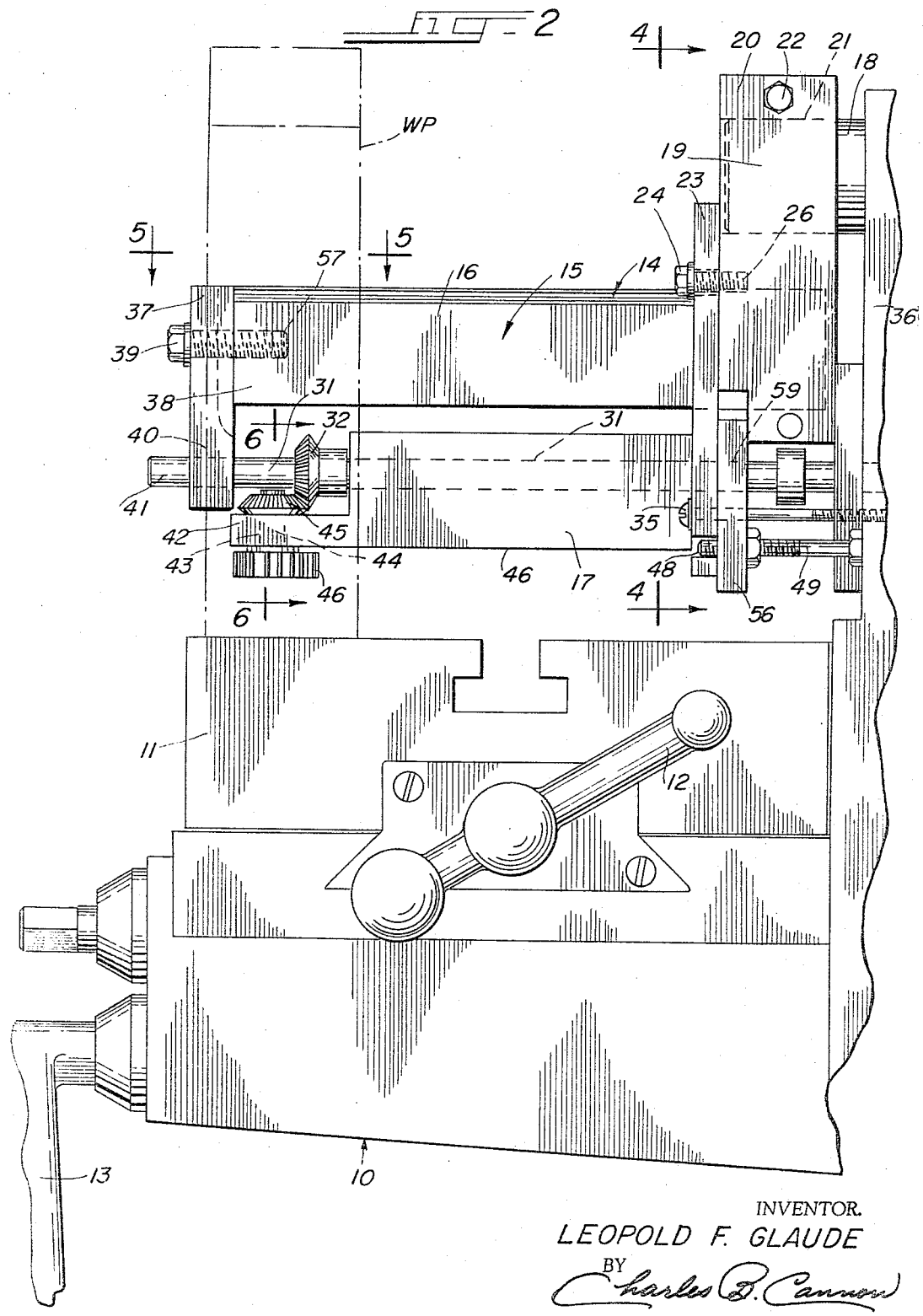

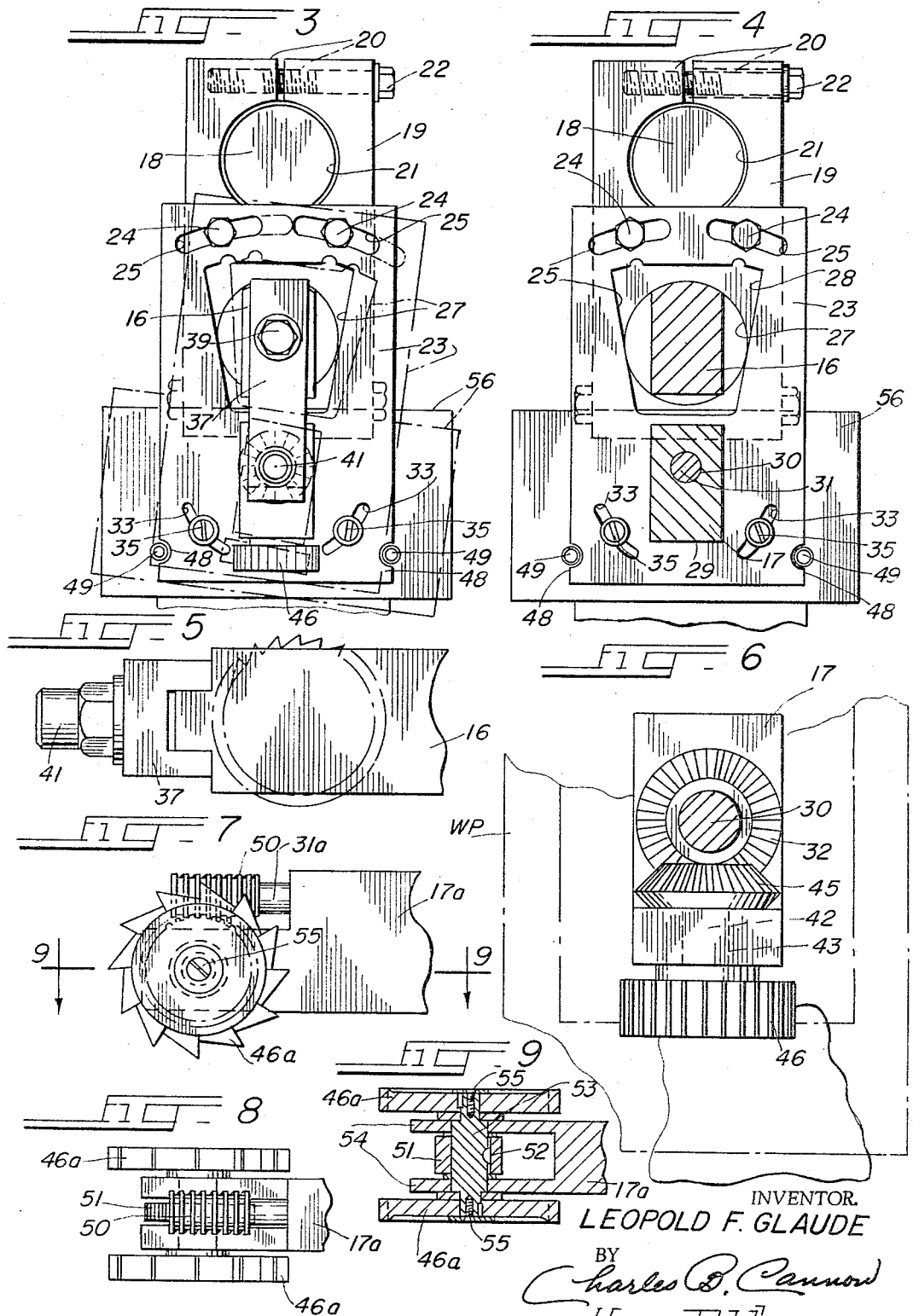

3,306,169
MILLING MACHINE ATTACHMENT
Leopold F. Glaude, 2314 N. Kilpatrick,
Chicago, Ill. 60639
Filed Apr. 20, 1965, Ser. No. 449,539
5 Claims. (Cl. 90—17)

This invention relates to milling machine attachments and, more particularly, to a milling machine attachment which makes it possible for the operator of a milling machine embodying the present invention to operate the cutter in confined and restricted areas and on work pieces in which the cutters of conventional milling machines cannot be operated.

One of the problems heretofore experienced in the art of milling machines has been the fact that the design and construction of such milling machines and cutters therefor has been such that when it is desired to work upon certain types of work pieces, such, for example, as certain types of steel dies or die blocks, this cannot be done because it is impossible to manipulate the cutter relative to the work piece in such a manner that the milling machine cutter can be operated on and in certain parts and areas of the work piece. One result of this has been that it is frequently necessary in such cases to conduct a second and reaming operation upon certain areas of the work piece after the milling machine cutter has completed its work thereon, as far as can be accomplished with the milling machine cutter, thereby adding to the time and expense involved in the operation on the work piece, such as in making a steel die.

Accordingly, an object of the present invention is to provide an attachment for a milling machine cutter which is so designed, constructed and arranged that it may be attached to conventional milling machines in such a manner as to mount the milling machine cutter in a position wherein it can be operated readily upon surfaces of work pieces, such as steel die blocks, on which the cutters of conventional milling machines cannot be operated because of the limitations of space in and about the area of the milling machine cutter, and for other reasons.

An additional object of the present invention is to provide a new and improved milling machine cutter attachment which is relatively simple and inexpensive in design and construction and which may be readily attached to conventional milling machines to enable the milling machine operator to work upon areas or surfaces of the work piece which can be reached only by moving the milling machine cutter relative to the work piece and relative to the bed or work table of the milling machine.

An additional object of the present invention is to provide a milling machine cutter attachment in one form of which a milling machine cutter may be pivotally and adjustably mounted on the body of the milling machine for rotary movement in a generally horizontal plane but in such a manner that it may be adjusted through a vertical arc for rotary movement at various angles relative to the horizontal to enable the cutter to work upon surfaces and areas of work pieces which could not be reached by the milling machine cutter if it were not thus adjustable.

Another object of the present invention is to provide a milling machine cutter attachment which embodies a pair of vertically arranged milling machine cutters which are pivotally and adjustably mounted on the body of the milling machine for rotary movement in a generally vertical plane in such a manner that they may be adjusted through a vertical arc for rotary movement at various angles relative to the vertical to enable the cutters to work upon surfaces and areas of work pieces which could not be reached by vertically arranged milling machine cutters as employed in conventional milling machines.

Other objects of the present invention will appear hereinafter.

In the drawings:

FIG. 1 is a fragmentary perspective view of a milling machine having the present invention attached thereto;

FIG. 2 is a side elevational view of a typical embodiment of the new milling machine cutter attachment as applied to a conventional milling machine, only part of which is shown;

FIG. 3 is a front elevational view of the new milling machine cutter attachment as seen from the left hand side in FIG. 2;

FIG. 4 is a view on line 4—4 in FIG. 2, partly in vertical section and partly in elevation;

FIG. 5 is a fragmentary top plan view on line 5—5 of FIG. 2 showing the mounting of the milling machine cutter in and upon the new milling machine attachment;

FIG. 6 is a vertical sectional view on line 6—6 in FIG. 2 illustrating the mounting of the milling machine cutter and driving gear mechanism therefor;

FIG. 7 is a fragmentary detail view illustrating a modification of the new milling machine cutter attachment and the mounting of a pair of milling machine cutters thereon;

FIG. 8 is a top plan view of the modification illustrated in FIG. 7; and

FIG. 9 is a sectional plan view on line 9—9 in FIG. 7.

A typical embodiment of the new milling machine cutter attachment is illustrated in FIGS. 1 to 6, inclusive, of the drawings, and is shown as being used in conjunction with a conventional milling machine, which is generally indicated at 10, and which includes a work table or bed 11, crank operating means 12 for moving the milling machine work table or bed 11 from left to right, as seen in FIG. 2, and additional crank operating means 13 for moving the work table or bed 11 in a forward and backward movement, as seen in FIG. 2.

In a conventional milling machine, such as is generally indicated at 10 in FIGS. 1 to 6, inclusive, of the drawings, the cutter is commonly positioned in reference to the milling machine and its work table or bed 11 in such a position that it is difficult and, in many instances impossible, to engage the cutter with certain surfaces of the work piece WP (FIG. 2), such, for example, as the interior surfaces of a steel die block, and the like, because of the limitations of space in and about the milling machine 10, its work table 11, and the cutter as normally mounted thereon.

In order to overcome the foregoing and other problems heretofore experienced in the art of milling machines, the present invention provides a milling machine cutter attachment, which is generally indicated at 14, and which includes a supporting unit, generally indicated at 15, and which includes an upper elongated horizontally extending and fixed or stationary shaft-supporting bracket member 16 and a lower horizontally extending and pivotally adjustable shaft-supporting bracket 17, which is pivotally mounted on the body of the milling machine 10 by means which will now be described.

To this end, a horizontally extending stub shaft 18 is mounted on an upright rear frame portion 36 of the milling machine 10, above the work table or bed 11, and a supporting hanger bracket 19 is mounted on and is suspended from the stub shaft 18. This supporting hanger bracket 19 includes a bifurcated clamping upper end portion 20 which is adapted to be adjusted, by means of a clamping bolt 22, and the bifurcated clamping upper end portion of the hanger bracket 19 is provided with a cylindrical opening 21 for the reception of the stub shaft 18 on which it is mounted. Thus, by operating the clamping bolt 22 the bifurcated clamping upper end portion 20 of the hanger bracket 19 may be clamped upon and released from clamping engagement with the stub shaft 18.

An adjustable supporting plate member 23, which is shown as being generally rectangular in shape, is pivotally and adjustably mounted upon the supporting hanger bracket 19. To this end arcuate shaped slots 25 are formed in the upper portion of the pivotal mounting plate member 23 and bolts 24 are extended through these arcuate slots 25 and are mounted in threaded openings 26 which are formed in the body of the hanger bracket 19 (FIG. 2). A generally circular-shaped opening 27 is formed in the body of the hanger bracket 19 for the reception of the stationary upper shaft-supporting bracket member 16, and a generally trapezoidal-shaped opening 28 is formed in the pivotal mounting plate member 23, forwardly of the opening 27, for the reception of the upper and stationary shaft-supporting bracket member 16 (FIG. 3).

A generally rectangular-shaped opening 29 is provided in the lower portion of the pivotal mounting plate member 23, for the reception of the lower and pivotally movable supporting bracket member 17, and a circular axially etxending bore 30 is provided in the lower and pivotally movable supporting bracket member 17 for the reception of a drive shaft 31 which is extended therethrough.

A pair of arcuate slots 33 are formed in the lower end portion of the pivotal mounting plate member 23 and fastening means, in the form of bolts 35, are extended through these arcuate slots 33 and are fastened to the upright rear frame structure 36 of the milling machine 10 (FIG. 1).

A generally rectangular-shaped supporting plate member 56 is located rearwardly of the lower portion of the the said pivotal mounting plate member 23 by means of two bolts 49 which extend through openings formed in the are formed in the lower corner edge portions of the supporting plate member 56. The front end portions of these bolts 49 extend through notched recesses 48 which are formed in the nower corner edge portions of the pivotal mounting plate member 23, as best shown in FIGS. 1, 3 and 4 of the drawings, and the rear end portion of each of the bolts 49 has a nut 58 thereon which abuts loosely against the upright frame structure 36 (FIGS. 1 and 2).

A shaft-supporting hanger member 37 is mounted on and is suspended from the front end portion 38 of the upper and stationary shaft-supporting bracket member 16 by means of a bolt 39 which is threaded into a threaded opening 57 in the front end portion 38 of the upper and stationary shaft-supporting bracket 16. A shaft bearing opening 40 is provided in the lower end portion of the shaft-supporting hanger member 37 and the front end portion 41 of the cutter-operating drive shaft 31 is rotatably mounted in the bearing opening 40 in the shaft-supporting hanger member 37. The lower and pivotally adjustable supporting bracket 17 has a reduced front end portion 42 in which a vertically extending bearing opening 43 is provided and a vertically extending cutter-supporting shaft 44 extends through and is mounted in the bearing opening 43. This cutter-supporting shaft 44 has a bevel gear 45 mounted on its upper end portion and this gear which meshes a gear 32 is mounted on the drive shaft 31 which is adapted to be operated by suitable power-operated driving means (not shown). A milling machine cutter 46, of conventional design, is mounted on the lower end portion of the cutter-operating shaft 42 and extends below the bottom horizontal surface 46' of the lower and pivotally mounted supporting bracket 17, above the work table or bed 11 of the milling machine 10, as shown in FIGS. 1 and 2, and is mounted so as to rotate in a generally horizontal plane.

The work piece indicated at WP (FIG. 2) may take the form of any object on which it is desired to perform a milling operation by means of the milling machine cutter 46. Thus, the work piece WP may be, for example, a steel die block which is adapted to be milled into the shape of a steel molding die for molding plastic resinous objects, or into the form of other dies, or the like.

In the use of the form of the invention illustrated in FIGS. 1 to 6, inculsive, of the drawings, the milling machine cutter 46 may be rotated by operation of the drive shaft 31, which acts through the gears 32 and 45 to rotate the cutter-bearing shaft 44 and the cutter 46 mounted thereon, which may then be engaged with the work piece WP.

As pointed out hereinbefore, it is frequently difficult and many cases impossible in milling machine operations to position the milling machine cutter in contact with the various surfaces of the work piece which it is desired to mill, since the cutter of conventional milling machines is commonly mounted in such a manner that it is not movable bodily relative to the work table or bed of the milling machine or relative to the work piece. Hence it is frequently impossible in the use of conventional milling machines to mill certain of the surfaces of the work piece such, for example, as in the interior of a steel die block or like work piece WP. The usual practice in overcoming this problem has been first to carry out the milling operation as far as possible and then to perform a supplementary and reaming operation on those surfaces of the work piece which cannot be milled out by the milling machine cutter. However, this practice adds to the expense of the work done on the work peice, in terms of time and labor, and is otherwise unsatisfactory.

In order to enable the milling machine cutter 46 to be moved into contact with the various surfaces of the work piece WP to perform the desired milling operations thereon, it is possible, in the practice of the present invention to pivot the milling machine cutter 46 in a generally vertical plane and through a limited vertical arc. This is accomplished by loosening the bolts 24 in the arcuate slots 25 in the upper portion of the pivotal mounting plate member 23 and loosening the bolts 35 in the arcuate slots 33 in the lower portion of the pivotal mounting plate member 23, whereupon the lower and pivotally movable shaft-supporting bracket 17, the pivotal mounting plate member 23 and the plate 56 and attached bolts 49 and nuts 58 may be pivoted, as a unit, upon and relative to the hanger bracket 19, and upon and relative to the drive shaft 31, as, for example, clockwise from full line to dotted line position in FIG. 3, whereupon the bolts 24 and 35 may be tightened in their respective arcuate slots 25 and 33. During this operation, the pivotal supporting plate member 23, the lower and pivotally movable drive shaft supporting bracket 17, and the plate 56 pivot upon the drive shaft 31 and upon and relative to the vertically extending hanger bracket 19. When the lower and pivotally movable drive shaft-supporting bracket member 17, and pivotal mounting plate member 23 are thus pivoted, as a unit, upon and relative to the drive shaft 31 and upon and relative to the hanger bracket 19, the milling machine cutter 46 is pivotally moved in a generally vertical plane and in a limited vertical arc, from full to dotted line position, as shown in FIG. 3, thereby positioning the milling machine cutter 46 relative to the work table or bed 11 in a position to enable it to engage surfaces and areas of the work piece WP, such as the interior of a steel die block, which would not be accessible to or by the milling machine cutter 46 in the customary mounting of milling machine cutters on conventional milling machines. When so positioned (as in dotted lines, FIG. 3) the milling machine cutter 46 may be operated in a plane which is somewhat inclined from its normal operating position, in a horizontal plane, as in full lines, FIG. 3.

When it is desired to return the milling machine cutter 46 to its normal horizontal position, this may be readily accomplished by loosening the bolts 24 in their slots 25, and loosening the bolts 35 in their slots 33 in the pivotal mounting plate member 23, and then pivoting the lower pivotally movable supporting bracket member 17 and the pivotal mounting plate member 33 upon and relative to the drive shaft 31 and upon and relative to the hanger bracket 19, as a unit, from dotted to full line position (counterclockwise), as shown in FIG. 2, and then again tightening the bolts 24 and 35 in their slots 25 and 33, respectively.

In this manner the milling machine cutter 46 may be adjusted to mill out surfaces and areas in the work piece WP which would not otherwise be accessible to a milling machine cutter as conventionally mounted in milling machines, and the necessity for performing a reaming, or like operation, following the milling operations on the work piece WP, is eliminated.

The plate 56 and attached bolts 49 and nuts 58 serve as a support to keep the supporting means 14–15–16–17 and the driving means 31–41–32–42 for the milling machine cutter 46 in proper and level position.

A modification of the invention is illustrated in FIGS. 7, 8 and 9 of the drawings and those parts thereof which are similar to, or which are comparable to, corresponding parts of the form of the invention shown in FIGS. 1 to 6, inclusive, have been given similar reference numerals followed by the additional and distinguishing reference character "a."

In the form of the invention illustrated in FIGS. 7, 8 and 9 of the drawings, the lower and pivotally movable supporting bracket member 17a has a reduced and bifurcated front or outer end portion 54, which is disposed below the drive shaft 31a, and a worm gear 50 is mounted on the front end portion of the drive shaft 31a. The worm gear 50 meshes with a gear 51 which is mounted on a horizontally extending shaft 53 which is journalled in the reduced bifurcated front end portion 54 of the lower supporting bracket 17a; the gear 51 being keyed to the shaft 53 as at 52. A pair of vertically extending milling machine cutters 46a are mounted on the outer end portions of the horizontally extending shaft 53 and are fastened thereto by suitable fastening means in the form of screws 35.

The form of the invention illustrated in FIGS. 7, 8 and 9 of the drawings is particularly adapted for use on work pieces such as, for example, as steel die blocks, where it is desirable to have the milling machine cutters 46a work in a generally vertical plane, rather than in a generally horizontal plane, as is in the case of the milling machine 46 which is embodied in the form of the invention illustrated in FIGS. 1 to 6, inclusive.

Thus, it will be noted that in the use of the form of the invention illustrated in FIGS. 7, 8 and 9 of the drawings, the vertically extending milling machine cutters 46a may be pivoted in a generally vertical plane and through a limited vertical arc, in the same manner as has been described hereinbefore in connection with the pivotal adjustment of the milling machine cutter 46, in the form of the invention illustrated in FIGS. 1 to 6, inclusive, of the drawings. In this manner it is possible to position the milling machine cutters 46a in position to mill out areas and surfaces in the work piece which would not otherwise be accessible to a milling machine cutter in the use of vertically extending mill machine cutters as conventionally mounted on milling machines.

It will thus be seen from the foregoing description, considered in conjunction with the accompanying drawings, that the present invention provides a new and improved milling machine cutter attachment having the desirable advantages and characteristics, and accomplishing its intended objects, including those hereinbefore pointed out and others which are inherent in the invention.

I claim:

1. An attachment for a milling machine which includes a work table or bed, said milling machine attachment comprising generally horizontally extending drive shaft projecting over and above the said work table or bed, a milling machine cutter, a supporting frame structure located at one side of the said work table or bed, means cooperating with the said supporting frame structure for supporting the said drive shaft for rotation, means cooperating with the said drive shaft-supporting means for supporting the said milling cutter for rotation above the said work table or bed, means operatively interconnecting the said drive shaft and the said milling machine cutter for rotation of the said milling machine cutter, and manually adjustable means adjustably mounted upon the said supporting frame structure for pivotally adjusting the said supporting means for the said drive shaft and with the said supporting means for the said milling machine cutter to position the said milling machine cutter for rotation at a preselected angle relative to and above the said work table or bed, said supporting means for the said drive shaft comprising an elongated horizontally extending supporting member extending over and above the said work table or bed and pivotally adjustable upon and relative to the said drive shaft, a relatively stationary elongated supporting means extending over and above the said pivotally mounted supporting member and having means thereon for supporting the front end portion of said drive shaft, and in which the said manually adjustable means comprises a vertically extending supporting plate member arranged at the rear of the said pivotally mounted supporting member and at the rear of the said relatively stationary elongated supporting member, and in which the said elongated horizontally extending supporting member is manually adjustable upon and relative to the said supporting frame structure.

2. An attachment for a milling machine which includes a work table or bed, said milling machine attachment comprising generally horizontally extending drive shaft projecting over and above the said work table or bed, a milling machine cutter, a supporting frame structure located at one side of the said work table or bed, means cooperating with the said supporting frame structure for supporting the said drive shaft for rotation, means cooperating with the said drive shaft-supporting means for supporting the said milling cutter for rotation above the said work table or bed, means operatively interconnecting the said drive shaft and the said milling machine cutter for rotation of the said milling machine cutter, and manually adjustable means adjustably mounted upon the said supporting frame structure for pivotally adjusting the said supporting means for the said drive shaft and with the said supporting means for the said milling machine cutter to position the said milling machine cutter for rotation at a preselected angle relative to and above the said work table or bed, said supporting means for the said drive shaft comprising an elongated horizontally extending supporting member extending over and above the said work table or bed and pivotally adjustable upon and relative to the said drive shaft, a relatively stationary elongated supporting means extending over and above the said pivotally mounted supporting member and having means thereon for supporting the front end portion of the said drive shaft, and in which the said elongated horizontally extending supporting member is manually adjustable upon and relative to the said supporting frame structure.

3. A milling machine attachment as defined in claim 2 in which the said milling machine cutter is mounted for rotation below the outer front end portion of the said drive shaft, and in which the said manually adjustable means is adjustable with the said supporting means for the said drive shaft and with the said supporting means for the said milling machine cutter to position the said milling machine cutter selectively for rotation in a generally horizontal plane or for rotation in a plane at an acute angle relative to the horizontal above the said work table or bed.

4. An attachment for a milling machine which includes a work table or bed, said milling machine attachment comprising generally horizontally extending drive shaft projecting over and above the said work table or bed, a milling machine cutter, a supporting frame structure located only at one side of the said work table or bed, means supported at one end by and cooperating with the said supporting frame structure for supporting the said drive shaft for rotation, means mounted on the other end of and cooperating with said drive shaft supporting means for supporting the said milling cutter for rotation above the said work table or bed, means operatively interconnecting the said drive shaft and the said milling machine cutter for rotation of the said milling machine cutter, and manually adjusting means adjustably mounted upon the said supporting frame structure for pivotally adjusting the said supporting means for the said drive shaft and with the said supporting means for the said milling machine cutter to position the said milling machine cutter for rotation at a preselected angle relative to and above said work table or bed, said supporting means for the said drive shaft comprising an elongated horizontally extending supporting member extending along and substantially throughout the length of the drive shaft and over and above the said work table or bed and pivotally adjustable about said drive shaft as an axis, and said cutter comprising a pair of spaced milling cutters each mounted on said member for rotation in a generally vertical plane or at an acute angle relative to the vertical above the said work table or bed.

5. An attachment for a milling machine which includes a work table or bed, said milling machine attachment comprising generally horizontally extending drive shaft projecting over and above the said work table or bed, a milling machine cutter, a supporting frame structure located only at one side of the said work table or bed, means supported at one end by and cooperating with the said supporting frame structure for supporting the said drive shaft for rotation, means mounted on the other end of and cooperating with said drive shaft supporting means for supporting the said milling cutter for rotation above the said work table or bed, means operatively interconnecting the said drive shaft and the said milling machine cutter for rotation of the said milling machine cutter, and manually adjusting means adjustably mounted upon the said supporting frame structure for pivotally adjusting the said supporting means for the said drive shaft and with the said supporting means for the said milling machine cutter to position the said milling machine cutter for rotation at a preselected angle relative to and above said work table or bed, said supporting means for the said drive shaft comprising an elongated horizontally extending supporting member extending along and substantially throughout the length of the drive shaft and over and above the said work table or bed and pivotally adjustable about said drive shaft as an axis, and said cutter being mounted on said member for rotation on a generally vertical axis or at an acute angle thereto above the said work table or bed.

References Cited by the Examiner

UNITED STATES PATENTS

| | | | |
|---|---|---|---|
| 1,029,208 | 6/1912 | Melling | 90—17 |
| 2,231,589 | 2/1941 | Olivetti | 90—16 |
| 3,083,617 | 4/1963 | Swanson et al. | 90—17 |

FOREIGN PATENTS

| | | |
|---|---|---|
| 163,814 | 5/1921 | Great Britain. |
| 350,856 | 6/1961 | Switzerland. |

WILLIAM W. DYER, Jr., *Primary Examiner.*